United States Patent [19]

Grisar et al.

[11] 3,882,104

[45] May 6, 1975

[54] 2-AZACYCLOALKYLMETHYL SUBSTITUTED PHENYL CARBINOLS AND KETONES

[75] Inventors: J. Martin Grisar; George P. Claxton, both of Cincinnati, Ohio

[73] Assignee: Richardson-Merrell Inc., Wilton, Conn.

[22] Filed: Apr. 25, 1973

[21] Appl. No.: 354,189

[52] U.S. Cl............ 260/240 CA; 424/245; 424/267; 424/274; 260/239 B; 260/293.84; 260/326.5 J; 260/326.5 S; 260/326.5 R
[51] Int. Cl...................... C07d 29/16; C07d 29/20
[58] Field of Search .... 260/240 CA, 293.84, 239 B, 260/326.5 R

[56] References Cited
UNITED STATES PATENTS
3,316,272   4/1967   Roberts et al............ 260/240 CA X

OTHER PUBLICATIONS

Uhlemann, Chem. Abstracts, Vol. 56, Col. 10092 (1962).

Claxton et al., J. Med. Chem., Vol. 15, pages 500 to 503 (1972).

Gupta et al., Canadian Jour. of Chemistry, Vol. 47, pages 445–447 (1969).

*Primary Examiner*—John D. Randolph
*Attorney, Agent, or Firm*—William J. Stein; Eugene O. Retter; George W. Rauchfuss, Jr.

[57] ABSTRACT

Novel derivatives of 2-azacycloalkylmethyl substituted pheny carbinols and ketones are described which are useful as anticoagulants.

5 Claims, No Drawings

3,882,104

2-AZACYCLOALKYLMETHYL SUBSTITUTED PHENYL CARBINOLS AND KETONES

FIELD OF THE INVENTION

This invention relates to novel 2-azacycloalkylmethyl substituted ketones and carbinols, to their methods of preparation and to their use in preventing the coagulation of blood.

BACKGROUND OF THE INVENTION

This invention is related to copending application U.S. Ser. No. 354,206, filed concurrently herewith, which describes a general procedure for the preparation of 2-azacycloalkylmethyl ketones. The closest prior art known to applicants includes the preparation of 4'-(fluoren-9-ylidenemethyl)-2-(2-piperidyl)acetophenone, Claxton et. al., J. Med. Chem. 15, 500 (1972), which is structurally unrelated to the instant compounds. To applicants' knowledge, the compounds described and claimed herein are compounds which have not previously been described nor reported in literature.

Finkelstein and Solodar, J. Amer. Chem. Soc. 81, 6508 (1959), disclosed the preparation of carbinols having the structure

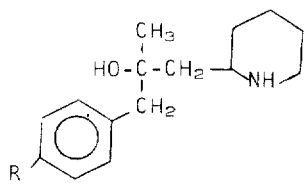

in which R can be the methoxyphenyl radical. These compounds, which are described as weak vasodepressor agents, are tertiary alcohols which are readily distinguished from the secondary alcohols of the present invention by the presence of a methylene radical which bridges the phenyl ring and the carbinol radical. The instant compounds have a substituted phenyl ring which is attached directly to the carbinol. Furthermore, the tertiary alcohols of the prior art cannot in fact be prepared in the manner described for the preparation of the compounds of the present invention. The reduction of the 2-azacycloalkylmethyl phenyl ketones described herein to their corresponding carbinols only results in the preparation of secondary carbinols not encompassed in the prior art.

The reaction of β-ketoacids with 2,3,4,5-tetrahydropyridines under "physiological" conditions to establish pathways of plant alkaloid biosynthesis has been explored by Schöpf and co-workers, Liebigs Ann. Chem. 626, 123 (1959). One of the compounds prepared in the course of this study was the compound α-phenacyl-piperidine having the structure

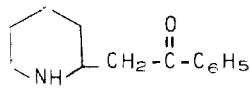

SUMMARY OF THE INVENTION

This invention relates to novel 2-azacycloalkylmethyl carbinols and ketones. More particularly, this invention relates to a class of substituted phenyl derivatives which are useful as anticoagulants and which may be represented by the general formula

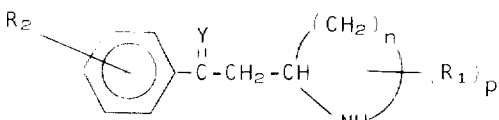

(1)

wherein $n$ is an integer of from 3 to 5; $p$ is an integer of from 1 to 2; $R_1$ is hydrogen or lower alkyl having from one to four carbon atoms; Y is the radical =O or

$R_2$ is selected from the group consisting of phenyl, halophenyl, trifluoromethylphenyl, alkylphenyl having from seven to 10 carbon atoms, alkoxyphenyl having from seven to 10 carbon atoms, alkylthiophenyl having from seven to 10 carbon atoms, phenoxy, alkylphenoxy having from seven to 10 carbon atoms, halophenoxy, trifluoromethylphenoxy, alkoxyphenoxy having from seven to 10 carbon atoms, alkylthiophenoxy having from seven to 10 carbon atoms, phenylthio, phenylalkyl having from seven to 10 carbon atoms, phenylvinyl, phenylalkoxy having from eight to 10 carbon atoms, phenoxyalkoxy having from eight to 10 carbon atoms; and the pharmaceutically acceptable acid addition salts thereof.

The compounds of this invention are prepared by heating a solution of a substituted phenylmethyl ketone with magnesium methyl carbonate to form a magnesium chelate, which is then condensed with a 1-azacycloalkene in an atmosphere of carbon dioxide. The 2-azacycloalkylmethyl substituted phenyl ketones so prepared are readily reduced to the corresponding carbinols by means of sodium borohydride.

A variety of compositions are also included within the scope of the present invention which are useful as anticoagulants.

DETAILED DESCRIPTION OF THE INVENTION

As seen by an examination of Formula (I) above, the compounds of the present invention share in common a 2-azacycloalkylmethyl moiety and a substituted phenyl radical, both of which are attached to the keto or carbinol function of the molecule. The azacycloalkylmethyl moieties include the five, six and seven-membered nitrogen containing saturated heterocyclic rings as defined by the symbol $n$. Thus, when n is an integer of from 3 to 5 and $R_1$ is hydrogen, the corresponding heterocycles, 1-pyrrolidine, piperidine and 2,3,4,5,6,7-hexahydro-1H-azepine, are delineated. These heterocycles may be further substituted as illustrated by the symbol $R_1$, which may represent a lower alkyl group in addition to hydrogen. The term "lower alkyl" includes members having from one to four carbon atoms. Illustrative members of this group include the radicals methyl, ethyl, propyl, isopropyl, butyl, sec.-butyl and t-butyl. The 2-azacycloalkyl rings may be either mono or di-substituted as indicated by the symbol p. When di-substituted, the lower alkyl radicals may be substituted either upon the same carbon atom or upon different carbon atoms. Further substitution in the 2-position, however, is precluded as illustrated by the presence of a hydrogen atom in Formula (I) above. Thus, for example, 6-methyl-2,3,4,5-tetrahydropyridine and 2-phenyl-1-pyrroline were found not to undergo condensation.

The compounds of this invention may also be regarded as derivatives of acetophenone, as when Y represents the =O radical. Alternatively, they may be regarded as derivatives of 2-piperidineethanol as when the symbol Y represents the radical

It should also be noted that a substituted phenyl radical is common to all of the novel compounds described herein and is directly attached to the carbon atom containing the keto or alcohol function. The presence of a substituent on this terminal phenyl radical is mandatory.

Various substituents on the phenyl radical which are included within the scope of the present invention are represented by the symbol $R_2$. Such substituents consist essentially of an additional phenyl radical or a substituted phenyl radical linked directly to the terminal phenyl radical or which can be linked through an ether, a thioether or an alkyl bridge to the terminal phenyl radical as indicated in Formula (I) above. These substituents are ones which impart an important lipophilic character to the molecule.

When $R_2$ is linked directly to the terminal phenyl portion of Formula (I), it can be as an unsubstituted or as a substituted phenyl radical. The various substituents include the trifluoromethyl radical, a lower alkyl radical (alkylphenyl having from seven to 10 carbon atoms) or a halogen (halophenyl). The term halogen as used herein includes the fluoro, chloro and bromo radicals, whereas the term lower alkyl as used throughout encompasses those alkyl substituents which have from one to four carbon atoms and which are specifically enumerated in the previous description of $R_1$ above. Furthermore, the lower alkyl group can be linked to the $R_2$ phenyl substituent as an ether (alkoxyphenyl having from seven to 10 carbon atoms) or as a thioether (alkylthiophenyl having from seven to 10 carbon atoms).

Similar variations exist when the $R_2$ phenyl substituent is linked through an ether or thioether bridge to the terminal phenyl radical. Thus the $R_2$ radical can represent a phenylether (phenoxy), a lower alkyl substituted phenylether (alkylphenoxy having from seven to 10 carbon atoms), a halogen substituted phenylether (halophenoxy), a trifluoromethyl substituted phenylether (trifluoromethylphenoxy), and a phenylether which has in turn been substituted with a lower alkyl ether (alkoxyphenoxy having from seven to 10 carbon atoms). The symbol $R_2$ includes certain thioethers, as for example, the phenylthioether (phenylthio) or a lower alkyl substituted phenylthioether (alkylthiophenoxy having from seven to 10 carbon atoms).

The radical $R_2$ can be linked to the terminal phenyl radical via a saturated lower alkyl bridge (phenylalkyl having from seven to 10 carbon atoms) or a 2-carbon unsaturated vinylene bridge (phenylvinyl). Other linking bridges include a lower alkyl ether bridge (phenylalkoxy having from eight to 10 carbon atoms) and a lower alkyl diether bridge (phenoxyalkoxy having from eight to 10 carbon atoms). For these last two situations the term lower alkyl is limited to those alkyl groups having from two to four carbon atoms only, i.e., excluding the methylene radical.

The compounds of the present invention are 2-azacycloalkylmethyl substituted phenyl ketones when prepared by the novel process of this invention. Reduction of these ketones to the corresponding alcohols, which are also active anticoagulants, is readily achieved using methods well known to those skilled in the art. Suitable reducing agents include complex metal hydride reducing agents. Applicants have found sodium borohydride to be the reducing agent of choice in carrying out this reduction. Two or more moles of sodium borohydride are generally used per mole of ketone reduced, the additional borohydride serving to neutralize the salts of the 2-azacycloalkylmethyl substituted phenyl ketones to their free base forms. The reaction is conducted in various organic solvents such as methanol, tetrahydrofuran or ethyl ether for periods ranging from a few minutes to about 24 hours. In general the reactants are mixed together at temperatures of 0°C. or below, whereupon the temperature is gradually allowed to increase to 30°C. Upon completion of the reaction, the reaction mixture is treated with water and the 2-azacycloalkylmethyl substituted vinylene carbinols are isolated and further purified by crystallization from an appropriate organic solvent.

The subclass of 2-pyrrolidinylmethyl and 2-piperidylmethyl substituted phenyl ketones are of particular interest inasmuch as they possess good anticoagulant activity and are readily prepared by condensation of the magnesium chelate of the methyl ketone with the 1-pyrroline trimer and the 2,3,4,5-tetrahydropyridine trimer, respectively. This class of compounds is delineated in Formula (I) above wherein the symbol $n$ is an integer of from 3 to 4, $R_1$ is hydrogen, and Y is an oxo function.

Illustrative specific base compounds which are encompassed by Formula (I) above include: 4'(fluorophenyl)-2-(2-pyrrolidinyl)acetophenone, 4'-phenyl-2-(5,5-dimethyl-2-pyrrolidinyl)acetophenone, 4'-[p-(trifluoromethyl)-phenyl]-2-(2-piperidyl)acetophenone, 4'-(p-butoxyphenyl)-2-(4-tert.-butyl-2-piperidyl)acetophenone, 2'-phenoxy-2-(2-piperidyl)acetophenone, 4'-(p-fluorophenoxy)-2-(5,5-dimethyl-2-pyrrolidinyl)acetophenone, 4'-(p-chlorophenoxy)-2-(2-piperidyl)acetophenone, 4'-[m-(trifluoromethyl)phenoxy]-2-(2-piperidyl)acetophenone, 4'-(p-butoxyphenoxy)-2-(2-pyrrolidinyl)acetophenone, 2-(2-piperidyl)-4'-(trans-p-tolylvinylene)acetophenone, 2-(2-hexahydro-1H-azepinyl)-4'-(trans-styryl)acetophenone, 4'-(m-methoxyphenylvinylene)-2-(2-pyrrolidinyl)acetophenone, 2-(2-piperidyl)-4'-[(p-methylthio)phenylvinylene]-acetophenone, 4'-(3-phenoxypropoxy)-2-(2-piperidyl)-acetophenone, 4'-(4-phenylbutyl)-2-(2-piperidyl)acetophenone, 4'-(α,α-dimethylbenzyl)-2-(2-piperidyl)acetophenone, 4'-phenethyl-2-(3,5-diethyl-2-piperidyl)acetophenone, 4'-phenyl-2-(2-pyrrolidinyl)acetophenone, α-[2-(2-phenylethoxy)phenyl]-2-piperidineethanol, α-(p-phenoxy)phenyl-2-pyrrolidineethanol, α-[4-(4-bromophenoxy)phenyl]-6-methyl-2-piperidineethanol, α-(p-phenethyl)phenyl-2-pyrrolidineethanol, α-p- biphenylyl-2-hexahydro-1H-azepineethanol, α-[3-(4-phenoxybutoxy)phenyl]-2-piperidineethanol, and α-(4-benzyl)phenyl-2-piperidineethanol.

The expression "pharmaceutically acceptable acid addition salts" refers to any non-toxic organic or inorganic acid addition salts of the base compounds represented by Formula (I). Illustrative inorganic acids which form suitable salts include hydrochloric, hydrobromic, sulfuric and phosphoric acids as well as acid metal salts such as sodium monohydrogen orthophosphate and potassium hydrogen sulfate. Illustrative organic acids which form suitable salts include the mono, di and tricarboxylic acids. Illustrative of such acids are, for example, acetic, propionic, glycolic, lactic, pyruvic, malonic, succinic, glutaric, fumaric, malic, tartaric, citric, ascorbic, maleic, hydroxymaleic, benzoic p-hydroxybenzoic, phenylacetic, cinnamic, salicylic, 2-phenoxybenzoic and sulfonic acids such as methanesulfonic acid and 2-hydroxy ethanesulfonic acid. Either the mono or the di-acid salts can be formed, and such salts can be utilized in either a hydrated or a substantially anhydrous form.

In general the 2-azacycloalkylmethyl substituted phenyl ketones of the present invention are prepared by reacting a substituted phenyl methyl ketone with magnesium methyl carbonate (MMC) in solution to form a magnesium chelate. The resulting chelate is condensed in an atmosphere of carbon dioxide with a 1-azacycloalkene or a substituted 1-azacycloalkene at moderate or ambient temperatures. The 2-azacycloalkylmethyl substituted phenyl ketones which are formed are isolated as their acid addition salts or as their free base by precipitation or extraction from the reaction mixture. This reaction is schematically represented as follows:

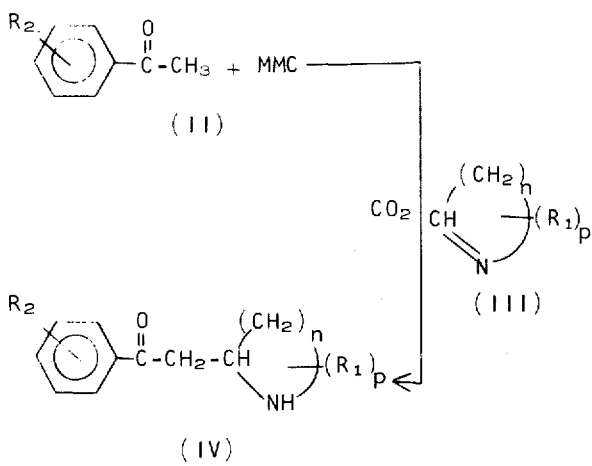

wherein the symbols $n$, $p$, $R_1$ and $R_2$ have the values previously assigned.

The MMC reagent is prepared by the addition of magnesium turnings to dry methanol until all of the metal is converted to magnesium methoxide. A solvent such as dimethylformamide is added and the stirred solution saturated with dry carbon dioxide as described by H. L. Finkbeiner and M. Stiles, J. Am. Chem. Soc., 85, 616 (1963). When a methyl ketone is permitted to react with a large excess of this reagent, a chelate results which is believed to have the formula:

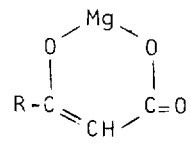

(V)

Generally, a 2 to 6 molar excess of the MMC reagent is employed at a temperature ranging from 80° to 120°C. Preferably an excess of 4 moles of MMC reagent is used for chelation at the higher temperatures. The methanol that is formed is removed by sweeping a stream of an inert gas, such as nitrogen, over the hot solution. After a period of time ranging from 2 to 36 hours the chelate solution is permitted to cool and the inert gas is replaced with carbon dioxide. The solution is saturated with carbon dioxide and a carbon dioxide atmosphere is maintained throughout the condensation of the chelate with the 1-azacycloalkene.

To the magnesium chelated methyl ketone solution is added a one molar equivalent or slight excess of 1-azacycloalkene with stirring. In general the condensation is effected by stirring the reaction mixture at ambient temperatures. The preferred solvent is dimethylformamide since the MMC reagent is ordinarily prepared therein. On occasion it may be advantageous to add an additional inert solvent to the reaction mixture if, for example, the reaction is to be conducted at a temperature of less than −61°C., the freezing point of dimethylformamide. It is further practicable to precipitate the magnesium chelate by the addition of large amounts of ether and to dissolve or suspend the precipitated chelate in other inert solvents. Suitable solvents include tetrahydrofuran, benzene or dimethylacetamide.

Condensation takes place at temperatures ranging from −50° to 100°C. Preferably the reaction is conducted at temperatures ranging from 0°–60°C. both as a matter of convenience and since elevation of the reaction temperature above 100°C. results in diminished yields.

The reaction time varies from a few hours to several weeks depending upon the reaction temperature and the nature of the reactants, particularly with respect to the degree of steric hindrance of the substituted phenyl methyl ketone (II). Inasmuch as the reaction is conducted and remains a homogenous solution -tripiperidein. completion, the duration of the reaction can readily be extended for several weeks. Preferably the reaction is conducted in a period of from 16 to 60 hours. -tripiperidein.

Of particular importance to the successful operation of this reaction is the maintenance of an appropriate atmosphere. Some success is obtained under normal atmospheric conditions, particularly in the presence of a small amount of moisture. Under anhydrous conditions in an atmosphere of nitrogen, however, no product is obtained. Consistently good yields result when the condensation is carried out in an atmosphere of carbon dioxide.

The desired products of this invention are isolated by pouring the reaction mixture into an excess of dilute acid. Preferably a mixture of 2 to 12 normal hydrochloric acid and ice is employed. When the acid addition salt of the desired 2-azacycloalkylmethyl ketone precipitates, it is collected by filtration. Alternatively, the acidified reaction mixture is extracted with a suitable solvent, as for example, chloroform or methylene chloride, and the solvent extract evaporated, leaving the desired product as a residue. It is also possible, but generally more cumbersome, to treat the acidified reaction mixture with a base such as sodium hydroxide until alkaline. The desired product can then be extracted using an appropriate solvent from the alkaline slurry containing precipitated magnesium hydroxide. In either event the crude products are readily purified by recrystallization of their acid addition salts using ordinary solvents or solvent mixtures.

It is important to note that the 1-azacycloalkenes can exist as trimers, as for example, the trimers of 1-pyrroline and 2,3,4,5-tetrahydropyridine. In the case of the latter compound it can exist in two isomeric forms that are known as $\alpha$ and $\beta$-tripieridein. In solution these trimers readily depolymerize to their monomers in a manner similar to the well known behavior of formaldehyde. However, under alkaline aqueous conditions 2,3,4,5-tetrahydropyridine undergoes an irreversible self-condensation to form $\gamma$-tripieridein. This self-condensation does not occur using the process of the present invention.

Illustrative 1-azacycloalkenes as indicated in Formula (III) above which are useful in the instant process include: 1-pyrroline, 3-methyl-1-pyrroline, 5,5-dimethyl-1-pyrroline, 3-propyl-2,3,4,5-tetrahydropyridine, 4-t.-butyl-2,3,4,5-tetrahydropyridine, 3,5-diethyl-2,3,4,5-tetrahydropyridine, 3,4,5,6-tetrahydro-2H-azepine, and 2,2-dimethyl-3,4,5,6-tetrahydro-2H-azepine.

The substituted phenyl methyl ketones or acetophenones employed herein as starting materials are either commercially available or can be prepared using well known procedures. Thus, Friedel-Crafts acylation, typically using acetylchloride or acetic anhydride and aluminum chloride as a catalyst in such solvents as carbon disulfide, ethylene dichloride or nitrobenzene can be employed to prepare 4'-[(substituted)phenyl]acetophenone, 4'-(phenoxy)acetophenone, 4'-[(substituted)phenoxy]-acetophenone, 4'-(phenylthio)acetophenone, 4'-(benzyl)-acetophenone, 4'-(phenylethyl)acetophenone and 4'-[(substituted)-phenyl]acetophenone. The preparation of phenylalkoxy and phenoxyalkoxyacetophenones is achieved by the reaction of 2'-, 3'- or 4'-hydroxyacetophenone with a phenyl or phenoxyalkyl halide in the presence of a base. A somewhat unusual method is employed for preparing the 4'-(phenylvinyl)acetophenone, which is a special case of the Sandmeyer reaction, G. A. R. Kon, J. Chem. Soc. 1948, 224.

The compounds of the present invention, including their acid addition salts and isomers, are useful as anticoagulants. They affect the coagulation of blood by preventing the aggregation of blood platelets. The blood platelets play a dominant role in thrombotic conditions, both in the initial event and at the occlusive stage. Arterial thrombosis, particularly in arteries supplying the heart muscle and brain, is a leading cause of death and disability. Additionally, the compounds 4'-(p-chlorophenyl)-2-(2-piperidyl)acetophenone and 2-(2-piperidyl-4'-(trans-styryl)acetophenone block the biosynthesis of cholesterol by the inhibition of $\Delta^7$-dehydrogenase.

The compounds of the present invention can be administered to animals, mammals and humans, either per se or in combination with conventional pharmaceutical carriers in dosage unit forms. Suitable dosage unit forms include oral preparations such as tablets, capsules, powders, granules, oral solutions and suspensions, sublingual and intrabuccal preparations, as well as parenteral dosage unit forms which are useful for subcutaneous, intramuscular or intravenous administration. The quantity of active ingredient administered can vary over a wide range so as to provide from about 1.0 mg/kg to about 100 mg/kg of body weight per day in order to achieve the desired effect. Each unit dose can contain from about 5 to 500 mg of the active ingredient in combination with the pharmaceutical carrier. Such doses may be administered from one to four times daily.

In preparing solid compositions such as tablets, the principal active ingredient is mixed with conventional pharmaceutical excipients such as gelatin, starches, lactose, magnesium stearate, talc, acacia, dicalcium phosphate and functionally similar materials. Capsules are prepared by mixing the active ingredient with an inert pharmaceutical filler or diluent and filled in either hard gelatin capsules or machine encapsulated soft gelatin capsules. Syrups or elixirs can contain the active ingredients together with sucrose or other sweetening agents, methyl and propyl parabens as preservatives, and suitable coloring and flavoring agents.

Parenteral fluid dosage forms are prepared by utilizing the active ingredient in a sterile liquid vehicle, the preferred vehicle being water or a saline solution. Compositions having the desired clarity, stability and adaptability for parenteral use are obtained by dissolving from about 0.1 mg to about 3 grams of the active ingredient in a vehicle consisting of a mixture of nonvolatile liquid polyethylene glycols which are soluble in both water and organic liquids, and which have molecular weights ranging from about 200 to about 1,500. Such solutions may advantageously contain suspending agents, such as sodium carboxymethylcellulose, methylcellulose, polyvinylpyrrolidone or polyvinyl alcohol. Additionally, they may contain bactericidal and fungicidal agents, as for example, parabens, benzyl alcohol, phenol or thimerosal. If desired, isotonic agents can be included, such as sugar or sodium chloride, as well as local anesthetics, stabilizing or buffering agents. In order to further enhance stability, the parenteral compositions may be frozen after filling and water removed by freeze-drying techniques well known in the art, enabling such dry, lyophilized powders to be reconstituted immediately prior to their use.

The following preparations and examples are illustrative of the novel compounds of the present invention and their compositions, but are not to be construed as necessarily limiting the scope thereof.

EXAMPLE I 2,3,4,5-Tetrahydropyridine Trimer

To 170 g (2.0 moles) of piperidine is added 120 g (2.0 moles) of acetic acid via dropwise addition at a temperature below 10°C. The resulting solution is added dropwise over a period of one hour to an aqueous solution containing 2.2 moles of Ca(ClO)$_2$ while maintaining the temperature of the reaction mixture at 0° to −5°C. Stirring is continued for an additional 15 minutes, and the mixture is extracted with ether. The ether extracts are combined, dried over anhydrous $Na_2SO_4$ and most of the solvent removed. (Caution! N-chloropiperidine tends to decompose spontaneously.) Approximately 200 ml of ether is permitted to remain and temperatures in excess of 60°C. are avoided. The remaining ether solution is added over a period of 2.5 hours in dropwise fashion to a vigorously stirred, refluxing solution containing 265 g (4.0 moles) of potassium hydroxide in 1,250 ml of anhydrous ethyl alcohol. Stirring is continued for 2 hours and the mixture is allowed to remain at room temperature during which the 2,3,4,5-tetrahydropyridine trimerizes. The potassium chloride which precipitates is removed by filtration, washed with anhydrous ethanol, and the ethanol removed from the filtrate by distillation. The residue is dissolved in 750 ml of water, the potassium chloride previously collected is added, and the solution extracted with ether. The combined ether extracts are dried ($MgSO_4$) and the solvent removed by evaporation. Recrystallization of the residue from acetone yields 2,3,4,5-tetrahydropyridine as the α-trimer having a M.P. of 58°–61°C. The β-isomer (M.P. 40°–68°C.) can be converted to the more stable α-isomer by recrystallization from acetone containing 2% water. The material so prepared is stored in a closed container over potassium hydroxide and is stable for over 1 year.

EXAMPLE II

1-Pyrroline Trimer

To 140.3 g (1.05 moles) of N-chlorosuccinimide is added a solution of 71.1 g (1 mole) of pyrrolidine dissolved in 1 l of ethyl ether. The mixture is stirred at room temperature under $N_2$ for 24 hours and sufficient water added to dissolve the solids. The ether phase is separated, dried over anhydrous sodium sulfate and the solvent evaporated under nitrogen. (Caution! N-chloropyrrolidine tends to decompose spontaneously.) Approximately 100 ml of ether are permitted to remain and temperatures in excess of 60°C. are avoided. The remaining ether solution is added over a period of 1½ hours in dropwise fashion to a vigorously stirred, ice-cooled solution of 2 N methanolic potassium hydroxide. Stirring is continued for 1 hour and the methanol removed at a temperature of 25°–30°C. at a reduced pressure of approximately 200 mm. Water is added to the remaining residue and the resulting mixture is subjected to continuous extraction with ethyl ether. The ether extract is separated and distilled under nitrogen at atmospheric pressure. Fractions having a B.P. 81°–90°C. and 91°–97°C. were collected, the latter fraction warming spontaneously, presumably due to exothermic trimerization. Both fractions are capable of condensation with MMC chelates of methyl ketones.

EXAMPLE III

4′-(p-Chlorophenyl)-2-(2-piperidyl)acetophenone

Magnesium methyl carbonate (0.5 mole, 1 M in dimethylformamide) is heated to 120°C. under an atmosphere of carbon dioxide. The compound 4′-(p-chlorophenyl)acetophenone, 23.1 g (0.1 mole), is added and the mixture is stirred at 120°C. for 4 hours under a stream of nitrogen, allowing the methanol which forms to escape. The reaction mixture is allowed to cool to room temperature under an atmosphere of carbon dioxide and 10.1 g (0.12 mole) of 2,3,4,5-tetrahydropyridine trimer (as α-tripiperidein) is added and stirred at room temperature under carbon dioxide for a period of 42 hours. The reaction mixture is poured into 800 ml of 2 N hydrochloric acid, the product removed by filtration and washed with 2 N hydrochloric acid and ethyl ether. The desired 4′-(p-chlorophenyl)-2-(2-piperidyl)acetophenone is obtained as the hydrochloride salt and when recrystallized twice from isopropyl alcohol has a M.P. of 195°–196°C.

EXAMPLES IV – XIV

Following essentially the same procedure as in the preceding Example, the following ketones were substituted for the 4′-(p-chlorophenyl)acetophenone above

| Example No. | Reactant |
|---|---|
| IV | 4′-phenylacetophenone |
| V | 4′-phenoxyacetophenone |
| VI | 4′-benzylacetophenone |
| VII | 4′-(phenylthio)acetophenone |
| VIII | 4′-(trans-styryl)acetophenone |
| IX | 3′-(4-phenoxybutoxy)acetophenone |
| X | 4′-(p-bromophenoxy)acetophenone |
| XI | 4′-(4-methoxyphenoxy)acetophenone |
| XII | 4′-(4-methoxyphenyl)acetophenone |
| XIII | 4′-(3-phenylpropoxy)acetophenone |
| XIV | 2′-(phenethyloxy)acetophenone |

The following products are obtained as their hydrochloride salts respectively:

| Example No. | Product | M.P. |
|---|---|---|
| IV | 4′-phenyl-2-(2-piperidyl)-acetophenone | 208–9.5°C. (dec.) |
| V | 4′-phenoxy-2-(2-piperidyl)-acetophenone | 161–3.5°C. (dec.) |
| VI | 4′-benzyl-2-(2-piperidyl)-acetophenone | 206–7°C. |
| VII | 4′-(phenylthio)-2-(2-piperidyl)acetophenone | 149–51°C. |
| VIII | 2-(2-piperidyl)-4′-(trans-styryl)acetophenone | 227–9°C. |
| IX | 3′-(4-phenoxybutoxy)-2-(2-piperidyl)acetophenone | 133–6°C. |
| X | 4′-(p-bromophenoxy)-2-(2-piperidyl)acetophenone | 227–8°C. (dec.) |
| XI | 4′-(4-methoxyphenoxy)-2-(2-piperidyl)acetophenone | 177–9°C. (dec.) |
| XII | 4′-(4-methoxyphenyl)-2-(2-piperidyl)acetophenone | 204.5–5.5°C. (dec.) |
| XIII | 4′-(3-phenylpropoxy)-2-(2-piperidyl)acetophenone | 178–80°C. |
| XIV | 2′-(phenethyloxy)-2-(2-piperidyl)acetophenone | 176–8°C. |

EXAMPLE XV

4′-Phenethyl-2-(2-pyrrolidinyl)acetophenone

Magnesium methyl carbonate (0.4 mole, 2 M in dimethylformamide) is heated to 120°C. under carbon dioxide. The compound 4′-phenethylacetophenone, 22.4 g (0.1 mole), is added and the mixture is stirred at 120°C. for 4 hours under a stream of nitrogen allowing the methanol that forms to escape. The reaction mixture is allowed to cool to room temperature under an atmosphere of carbon dioxide and 8.3 g (0.12 mole) of 1-pyrroline (as the trimer) added and stirred at room temperature under carbon dioxide for a period of 40 hours. The solution is poured into a mixture of 200 ml of concentrated HCl and 800 g of ice and the product removed by filtration. The 4'-phenethyl-2-(2-pyrrolidinyl)-acetophenone when twice recrystallized in the form of its hydrochloride salt from an aqueous isopropanol solution is obtained in 63% yield (20.1 g) and has a M.P. of 200°–201°C. (dec.).

Following essentially the same procedure but substituting 4'-phenoxyacetophenone for the 4'-phenethylacetophenone above, results in the formation of 4'-phenoxy-2-(2-pyrrolidinyl)acetophenone as the hydrochloride salt, having a M.P. of 161°–162°C.

EXAMPLE XVI

Trans-α-[(p-styryl)phenyl]-2-piperidineethanol glycolate

To a suspension of 2.1 g (0.0567 mole) of sodium borohydride in 175 ml of absolute ethanol is added 6.45 g (0.0189 mole) of powdered 2-(2-piperidyl)-4'-(trans-styryl)acetophenone hydrochloride. The mixture is stirred at room temperature overnight and poured into ice-water. The product is extracted into ether and treated with a 10% aqueous acetic acid solution in order to destroy the boron complexes. The product is liberated by the addition of base and re-extracted into ethyl ether. The ether extract is dried over anhydrous sodium sulfate and the solvent evaporated leaving a residue to which 1 equivalent of glycolic acid is added. The trans-α-[(p-styryl)phenyl]-2-piperidineethanol glycolate is obtained as a mixture of diastereoisomers having a M.P. of 160°–184°C. (dec.).

EXAMPLES XVII – XXIII

Following essentially the same procedure as in the preceding Example, the following ketones were substituted for the 2-(2-piperidyl)-4'-(trans-styryl)acetophenone hydrochloride above

| Example No. | Reactant |
|---|---|
| XVII | 4'-phenyl-2-(2-pyrrolidinyl)-acetophenone |
| XVIII | 4'-(3-phenylpropoxy)-2-(2-piperidyl)acetophenone |
| XIX | 4'-(p-chlorophenyl)-2-(2-piperidyl)acetophenone |
| XX | 4'-(phenylthio)-2-(2-piperidyl)-acetophenone |
| XXI | 4'-(4-methoxyphenoxy)-2-(2-piperidyl)acetophenone |
| XXII | 4'-phenoxy-2-(2-piperidyl)-acetophenone |
| XXIII | 4'-(4-methoxyphenyl)-2-(2-piperidyl acetophenone |

The following products are obtained as a mixture of diastereoisomers of the salts indicated

| Example No. | Product | M.P. |
|---|---|---|
| XVII | α-p-biphenylyl-2-pyrrolidine-ethanol fumarate (2:1) | 175–9°C. (dec.) |
| XVIII | α-[4-(3-phenylpropoxy)phenyl]-2-piperidineethanol glycolate | 119–21°C. (dec.) |
| XIX | α-(4'-chloro-p-biphenylyl)-2-piperidineethanol maleate (1:1) | 164–6°C. (dec.) |
| XX | α-[p-(phenylthio)phenyl]-2-piperidineethanol maleate | 113–15°C. (dec.) |
| XXI | α-[4-(4-methoxyphenoxy)-phenyl]-2-piperidineethanol fumarate (2:1) | 177–84°C. (dec.) |

-Continued

| Example No. | Product | M.P. |
|---|---|---|
| XXII | α-(4-phenoxyphenyl)-2-piperidineethanol glycolate (1:1) which is separated by fractional recrystalization into the two pairs of diastereoisomers, having a M.P. of 138–40°C. (dec.) and 103–5°C. (dec.), respectively. | |
| XXIII | 1-(4'-methoxy-p-biphenylyl)-2-piperidineethanol glycolate (1:1) | 153–6°C. (dec.) |

EXAMPLE XXIV

The anticoagulant activity of the compounds of this invention is determined by the inhibition of platelet (white thrombus) aggregation, which is the initial phase involved in the coagulation of blood. Platelet-rich plasma (PRP) obtained from a human volunteer, having a platelet count of approximately 400,000/mm$^3$ is aggregated using approximately 2 micrograms of adenosine diphosphate pe ml of PRP. Quantitative platelet aggregation measurements are made using a photometer connected to an automatic recorder which measures the changes in optical clarity of a standard cell containing the test solution. As the platelets aggregate, light transmission increases and thus both the rate of aggregation and the degree of aggregation can be determined. In this fashion, adenosine diphosphate induced aggregation of platelet-rich plasma is compared under identical circumstances to a corresponding aliquot containing a dilute solution of the test compound. The results are expressed as a percent inhibition.

Following this procedure the compound 3'-(4-phenoxybutoxy)-2-(2-piperidyl)acetophenone hydrochloride at a concentration of 100 and 30 micrograms/-milliliter demonstrates an in vitro inhibition of adenosine diphosphate induced platelet aggregation in human platelet-rich plasma of 100% and 33% respectively.

EXAMPLE XXV

Preparation of a tablet formulation

One thousand tablets for oral use, each containing 25 mg of 3'-(4-phenoxybutoxy)-2-(2-piperidyl)acetophenone hydrochloride are prepared according to the following formulation:

| | | Grams |
|---|---|---|
| (a) | 3'-(4-phenoxybutoxy)-2-(2-piperidyl)-acetophenone hydrochloride | 25 |
| (b) | Dicalcium phosphate | 150 |
| (c) | Methylcellulose, U.S.P. (15 cps) | 6.5 |
| (d) | Talc | 20 |
| (e) | Calcium stearate | 2.5 |

The 3'-(4-phenoxybutoxy)-2-(2-piperidyl)acetophenone hydrochloride and dicalcium phosphate are mixed well, granulated with a 7.5% aqueous solution of methylcellulose, passed through a No. 8 screen and carefully dried. The dried granules are passed through a No. 12 screen, blended with talc and calcium stearate and compressed into tablets.

EXAMPLE XXVI

Preparation of a capsule formulation

One thousand two-piece hard gelatin capsules for oral use, each containing 100 mg of 4'-(p-chlorophenyl)-2-(2-piperidyl)acetophenone hydrochloride, are prepared from the following ingredients:

|     |                                                               | Grams |
| --- | ------------------------------------------------------------- | ----- |
| (a) | 4'-(p-chlorophenyl)-2-(2-piperidyl)-acetophenone hydrochloride | 100   |
| (b) | Lactose, U.S.P.                                               | 100   |
| (c) | Starch, U.S.P.                                                | 10    |
| (d) | Talc, U.S.P.                                                  | 5     |
| (e) | Calcium stearate                                              | 1     |

The finely powdered materials are mixed until uniformly dispersed and filled into hard shelled gelatin capsules of the appropriate size.

In a similar fashion one-piece soft gelatin capsules can be prepared in which the above formulation can be granulated, slugged or compressed directly into a rotary die or plate mold in which the capsule is formed. Alternatively, the above excipients may be omitted and the active ingredient dispensed as a powder directly into the capsule.

EXAMPLE XXVII

Preparation of a parenteral solution

A sterile aqueous suspension suitable for parenteral use is prepared from the following ingredients:

|     |                                                              | Grams |
| --- | ------------------------------------------------------------ | ----- |
| (a) | 3'-(4-phenoxybutoxy)-2-(2-piperidyl)-acetophenone hydrochloride | 1     |
| (b) | Polyethylene glycol 4000, U.S.P.                             | 3     |
| (c) | Sodium chloride                                              | 0.9   |
| (d) | Polyoxyethylene derivatives of sorbitan monooleate (TWEEN 80) U.S.P. | 0.4   |
| (e) | Sodium metabisulfite                                         | 0.1   |
| (f) | Methylparaben, U.S.P.                                        | 0.18  |
| (g) | Propylparaben, U.S.P.                                        | 0.02  |
| (h) | Water for injection q.s. to 100 ml                           |       |

The parabens, sodium metabisulfite, and sodium chloride are dissolved in approximately one-half the volume of water for injection at 80°C. with stirring. The solution is cooled to below 40°C. and the active ingredient is dissolved therein followed by the polyethylene glycol 4,000 and the polyoxyethylene derivatives of sorbitan monooleate. The cooled solution is adjusted to the final volume with water for injection and is then sterilized by sterile filtration through a suitable filter. Each one ml of solution contains 10 mg of 3'-(4-phenoxybutoxy)-2-(2-piperidyl)acetophenone hydrochloride as the active ingredient.

We claim:

1. A 2-azacycloalkylmethyl substituted phenyl carbinol and ketone having the formula:

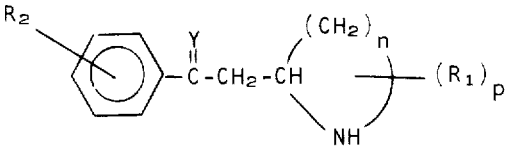

wherein $n$ is an integer of from 3 to 5; $p$ is an integer of from 1 to 2; $R_1$ is hydrogen or lower alkyl having from one to four carbon atoms; Y is the radical =O or

$R_2$ is selected from the group consisting of phenyl, halophenyl, trifluoromethylphenyl, alkylphenyl having from seven to 10 carbon atoms, alkoxyphenyl having from seven to 10 carbon atoms, alkylthiophenyl having from seven to 10 carbon atoms, phenoxy, alkylphenoxy having from seven to 10 carbon atoms, halophenoxy, trifluoromethylphenoxy, alkoxyphenoxy having from seven to 10 carbon atoms, alkylthiophenoxy having from seven to 10 carbon atoms, phenylthio, phenylalkyl having from seven to 10 carbon atoms, phenylvinyl, phenylalkoxy having from eight to 10 carbon atoms, phenoxyalkoxy having from eight to 10 carbon atoms; and the pharmaceutically acceptable acid addition salts thereof.

2. A compound of claim 1 wherein $n$ is an integer of from 3 to 4; $R_1$ is hydrogen; and Y is the radical =O.

3. A compound of claim 1 which is 4'-(p-chlorophenyl)-2-(2-piperidyl)acetophenone and its pharmaceutically acceptable acid addition salts.

4. A compound of claim 1 which is 2-(2-piperidyl)-4'-(trans-styryl)acetophenone and its pharmaceutically acceptable acid addition salts.

5. A compound of claim 1 which is 3'-(4-phenoxybutoxy)-2-(2-piperidyl)acetophenone and its pharmaceutically acceptable acid addition salts.

* * * * *